US012031361B2

(12) United States Patent
DeYoung

(10) Patent No.: US 12,031,361 B2
(45) Date of Patent: Jul. 9, 2024

(54) PUSH-TO-OPEN/SIGNAL-TO-OPEN APPLIANCE DOOR LATCHING SYSTEM WITH AN INTEGRATED LOCKING DEVICE

(71) Applicant: HTI Technology and Industries, Inc., La Vergne, TN (US)

(72) Inventor: Roger L. DeYoung, Franklin, TN (US)

(73) Assignee: HTI Technology & Industries, Inc., La Vergne, TN (US)

( * ) Notice: Subject to any disclaimer, the term of this patent is extended or adjusted under 35 U.S.C. 154(b) by 284 days.

(21) Appl. No.: 17/844,705

(22) Filed: Jun. 20, 2022

(65) Prior Publication Data

US 2023/0407689 A1 Dec. 21, 2023

(51) Int. Cl.

| | |
|---|---|
| ***E05C 19/02*** | (2006.01) |
| ***E05B 47/02*** | (2006.01) |
| ***E05B 47/06*** | (2006.01) |
| ***E05B 63/00*** | (2006.01) |
| ***F24C 15/02*** | (2006.01) |

(52) U.S. Cl.

CPC .......... *E05C 19/022* (2013.01); *E05B 47/023* (2013.01); *E05B 47/0603* (2013.01); *E05B 63/00* (2013.01); *F24C 15/022* (2013.01); *E05B 2063/0026* (2013.01)

(58) Field of Classification Search

CPC .. E05C 19/022; E05B 47/023; E05B 47/0603; E05B 63/00; E05B 2063/0026; F24C 15/022

See application file for complete search history.

(56) References Cited

U.S. PATENT DOCUMENTS

| | | | | |
|---|---|---|---|---|
| 3,462,584 | A | 8/1969 | Guy | |
| 4,927,996 | A | 5/1990 | Genbauffe et al. | |
| 6,302,098 | B1 | 10/2001 | Smith | |
| 6,315,336 | B1 * | 11/2001 | Swartzell | E05B 47/0012 292/201 |

(Continued)

FOREIGN PATENT DOCUMENTS

| | | |
|---|---|---|
| CN | 207905531 | 9/2018 |
| CN | 109209084 | 1/2019 |

(Continued)

OTHER PUBLICATIONS

International Search Report and Written Opinion mailed Aug. 4, 2017 for PCT Application No. PCT/US2017/031013 filed on May 4, 2017.

*Primary Examiner* — Mark A Williams

(74) *Attorney, Agent, or Firm* — Emerson, Thomson & Bennett, LLC; Roger D. Emerson; Peter R. Detorre

(57) ABSTRACT

Provided is a push-to-open latch for an oven appliance and other household appliances. The push-to-open latch includes an integrated locking device for locking an appliance door in place and initiate a downstream appliance function such as a self-cleaning function. The integrated locking device includes a rotating cam having a latching slot which engages a pawl. The rotating cam also includes a guiding ramp and a catch surface which may be used to engage a latching finger to lock the cam in place. In addition, the locking device may include a locking slide and a locking slide pin that is actuated by a solenoid to engage the cam. Once the appliance door is locked, one or more switches send a signal to the appliance controller to activate the downstream function.

17 Claims, 14 Drawing Sheets

(56) References Cited

U.S. PATENT DOCUMENTS

| | | | | |
|---|---|---|---|---|
| 6,698,418 | B2 | 3/2004 | Ramsey et al. | |
| 6,863,316 | B2 | 3/2005 | Cole | |
| 7,040,674 | B2 | 5/2006 | Lomicka et al. | |
| 7,137,387 | B2 | 11/2006 | Edwards | |
| 7,185,925 | B2 | 3/2007 | Courter et al. | |
| 7,364,209 | B2 | 4/2008 | Lomicka et al. | |
| 7,726,294 | B2 * | 6/2010 | Collene | F24C 15/022 70/318 |
| 7,956,304 | B2 * | 6/2011 | Bacigalupe | H01H 9/226 200/61.81 |
| 9,335,056 | B1 | 5/2016 | Lomicka et al. | |
| 9,958,167 | B2 | 5/2018 | Lomicka et al. | |
| 10,806,322 | B2 | 10/2020 | Dirnberger et al. | |
| 2003/0080569 | A1 | 5/2003 | Raymond et al. | |
| 2003/0116975 | A1 | 6/2003 | Cole | |
| 2004/0140677 | A1 | 7/2004 | Hengelein et al. | |
| 2005/0284464 | A1 | 12/2005 | Edwards et al. | |
| 2006/0208502 | A1 * | 9/2006 | Parent | E05B 81/14 292/216 |
| 2006/0232077 | A1 * | 10/2006 | Courter | F24C 15/022 292/201 |
| 2007/0090655 | A1 * | 4/2007 | Smith | E05B 17/0029 292/201 |
| 2007/0262590 | A1 * | 11/2007 | Courter | F24C 15/022 292/201 |
| 2007/0296224 | A1 * | 12/2007 | Courter | E05C 19/10 292/109 |
| 2008/0030028 | A1 | 2/2008 | Heid et al. | |
| 2008/0169657 | A1 * | 7/2008 | Horton | E05B 83/30 200/557 |
| 2017/0145613 | A1 | 5/2017 | Choi | |
| 2018/0371806 | A1 | 12/2018 | Jeong | |
| 2019/0017216 | A1 * | 1/2019 | Dirnberger | E05C 19/022 |
| 2019/0219269 | A1 * | 7/2019 | DeYoung | F24C 15/022 |
| 2019/0316400 | A1 * | 10/2019 | Shin | E05F 15/70 |
| 2020/0115927 | A1 * | 4/2020 | DeYoung | E05B 15/04 |

FOREIGN PATENT DOCUMENTS

| | | |
|---|---|---|
| CN | 112112500 | 12/2020 |
| DE | 202012005738 | 9/2013 |
| EP | 2840208 | 2/2015 |
| WO | 2010056062 | 5/2010 |

* cited by examiner

PUSH-TO-OPEN/SIGNAL-TO-OPEN APPLIANCE DOOR LATCHING SYSTEM WITH AN INTEGRATED LOCKING DEVICE

TECHNICAL FIELD

This present disclosure generally relates to a push-to-open oven door latching system having an integrated locking device for self-cleaning operations and other features.

BACKGROUND

Traditional construction and management of appliances (e.g., an oven door for an oven cooking appliance) incorporates a pivoting hinge at one end (bottom or side) and a pull-handle at the opposite end (top or opposite side) of the door to provide a user with a means for pulling the door open. Hinge systems on traditional oven doors also have biasing springs and cam detents to hold the door in a closed position. In recent years, some manufacturers have incorporated a push-to-open door latch that requires the user to push the oven door closed to activate the latching function of the push-to-open latch when it is desired to place the door in a closed position. The push-to-open latch also requires that the user conversely push in the oven door near the push-to-open latch to release the door to an open position. Push-to-open latches 20 typically incorporate gas or mechanical springs into the hinge system to provide forced motion at a regulated speed to control the door opening. Thus, the incorporation of a push-to-open latch in an oven eliminates the need for an oven door handle. Appliances which do not have handles have become a desired feature among consumers as it allows kitchens to be designed with appliances that are smoothly blended into the kitchen cabinetry.

Another feature of food cooking ovens is that they typically have a self-cleaning function. The self-cleaning function heats the oven to a high temperature for a period of time (typically 3-5 hours) to burn-off organic food residues that have accumulated on inner surfaces of the oven cavity. Self-cleaning temperatures significantly exceed normal cooking temperatures 30 and thus create a burn or fire risk to users during the self-cleaning cycle. To protect users from personal injury or fire risks, oven appliance manufacturers incorporate a door locking device that prevents the oven door from opening during the self-clean cycle and for a period of cooling after the self-clean cycle until the oven temperature has cooled to a safe level.

Manufacturers of appliances such as home oven appliances often equip ovens with door latches that locks the oven door in a closed state during self-clean operations during which the oven is heated to an elevated temperature to burn-off organic deposits that remain on the inside surfaces of the oven cavity after food cooking operations are completed. Further, push-to-open latches have been incorporated into some to said ovens as a convenient way to open oven doors without physically pulling a handle to open the oven door. An even more advanced push-to-open latch incorporates a signal-to-open feature that opens oven doors with an electric signal generated by human touch, voice, or motion. The push-to-open latch described herein is similar to the latch described in U.S. Pat. No. 11,236,911 with the primary variance being that the latch system disclosed herein incorporates a synchronous electric motor to operate the self-clean locking mechanism as compared to using a solenoid described in the aforementioned patent. Advantages of this motorized version include reduced component complexity, quieter operation, and the ability to operate at higher temperatures than a solenoid.

SUMMARY

Provided is a push-to-open latching and locking system for a door connected to an appliance including: an appliance door supported on an appliance by a hinge, wherein the appliance door may be adjusted between an open position and a closed position to allow access to an appliance cavity and wherein the appliance door includes a pawl; a latch connected to the appliance which is capable of engaging the pawl on the appliance door; a controller which is electrically connected to the push-to-open latching and locking device; and, a motorized locking mechanism. The motorized locking mechanism includes a synchronous electric motor and a motor cam engaged to the motor through a motor shaft, a switch and actuator plate positioned on a top surface of the carriage frame; a rotating cam switch and a locking arm switch attached to the switch and actuator plate; a locking arm engaged to the switch and actuator plate through a locking arm pivot; a rotating cam switch actuator engaged to the switch and actuator plate through a rotating cam switch actuator pivot; a latch mounting bracket comprising a flat planar surface and a vertical side edge; a carriage frame connected to the flat planar surface of the latch mounting bracket, wherein the carriage frame comprises a bottom surface, a side surface, a top surface having a top end and a bottom end; a rotating cam having an exterior surface connected to the latch mounting bracket and rotatable with respect to the latching mounting bracket. The rotating cam includes: a latching slot integrated within the exterior surface for engaging the pawl; a guiding ramp on the exterior surface of the rotating cam; a catch surface; a secondary ramp, and a latching finger having a first end which is attached to the carriage frame and a second end having a projection, wherein the second end of the latching finger is capable of being lifted by the guiding ramp upon rotation of the rotating cam in a first direction when a user engages the rotating cam with the pawl, wherein complete rotation of the rotating cam in the first direction results in the latching finger engaging the catch surface of the rotating cam, wherein the latching finger may be released from the catch surface by a user pushing in the appliance door near the latch to induce rotation of the rotating cam in a second opposite direction, wherein rotation of the rotating cam in the second direction guides the latching finger to the secondary ramp and results in lifting the latching finger to release the latching finger from the catch surface.

According to further aspects of the present teaching, the motor is positioned on the latch mounting bracket.

According to further aspects of the present teaching, the locking arm pivot allows for rotational movement of the locking arm with respect to the switch and actuator plate.

According to further aspects of the present teaching, the rotating cam switch actuator pivot allows for rotational movement of the rotating cam switch actuator with respect to the switch and actuator plate.

According to further aspects of the present teaching, the locking arm includes a first end and a second end, wherein the locking arm pivot is positioned at the first end of the locking arm and wherein the second end of the locking arm comprises a locking arm pin which extends from a bottom surface at the second end of the locking arm.

According to further aspects of the present teaching, the locking arm includes an override spring arm affixed to the first end of the locking arm, wherein the override spring arm is capable of contacting the motor cam. In certain embodiments, the override spring arm is rigidly affixed to the first end of the locking arm.

According to further aspects of the present teaching, the locking arm includes a locking arm return spring having a first end engaged to the locking pin and a second end engaged to a carriage anchor pin.

According to further aspects of the present teaching, the rotating cam switch actuator includes a first end and a second end, wherein a rotating cam switch actuator spring is engaged to the second end of the rotating cam switch actuator and rests against the rotating cam switch.

According to further aspects of the present teaching, the locking arm switch includes a locking arm switch button.

According to further aspects of the present teaching, the locking arm includes a locking arm switch ramp capable of pressing the locking arm switch button.

According to further aspects of the present teaching, the rotating cam switch includes a rotating cam switch button.

According to further aspects of the present teaching, the rotating cam switch actuator includes a rotating cam switch actuator bump capable of pressing the rotating cam switch button.

According to further aspects of the present teaching, the motor cam rotates to actuate the override spring arm which in turn rotates the locking arm and locking arm pin to engage a locking pin slot in the rotating cam to lock the rotating cam in a non-rotating condition.

According to further aspects of the present teaching, the locking arm switch upon pressing of the locking arm switch button by the locking arm switch ramp provides a door locked status signal to the controller, wherein upon receiving the door locked status signal, the controller stops powering the motor and stops rotating the motor cam.

According to further aspects of the present teaching, the locking arm includes a locking arm tool override tool recess which is capable of receiving a tool to manually rotate the locking arm to pull the locking arm pin out of the locking pin slot.

According to further aspects of the present teaching, the push-to-open latching and locking system includes the following features: wherein closing the door causes the pawl to contact the rotating cam and to rotate the rotating cam to a closed position; wherein upon rotation of the rotating cam to the closed position, the latching finger engages the catch surface on the rotating cam to lock it into position; wherein rotational movement of the rotating cam upon closing the door causes the rotating cam to contact the rotating cam switch actuator which in turn causes the rotating cam switch actuator to move to contact the rotating cam switch; wherein upon contacting the rotating cam switch, the rotating cam switch is activated and sends an electrical signal to the controller indicating that the door is closed and latched; wherein the controller activates an appliance self-clean function; wherein upon activating the self-clean function, the controller sends electrical power to the electric motor; wherein the electric motor rotates the motor shaft, which in turn rotates a motor cam which causes a locking arm to rotate; wherein rotation of the locking arm causes a locking pin to rotate and engage a locking pin slot in the rotating cam, thereby locking the rotating cam in a non-rotating position; wherein rotation of the locking arm also causes the locking arm to contact and activate the locking arm switch; wherein the activated locking arm switch sends a signal to the controller; wherein upon receiving a signal from the locking arm switch, the controller stops power to the motor causing rotation of the motor cam to stop; wherein the door is now locked; wherein the controller sends a signal for an appliance heating element to initiate heating of the appliance to temperatures suitable for self-cleaning; and wherein self-cleaning continues until a programmed cycle or period of time is completed or until a position of the locking arm changes by manual override.

Provided is a method for overriding a latched and locked door of the push-to-open latching and locking system. The method includes the following steps: inserting a locking arm tool into a locking arm tool override tool recess moving the locking arm tool in the recess to rotationally move the locking arm so that the locking arm pin is pulled out of the locking pin slot and out of the cam pushing the door inwards to allow the cam to rotate so that the pawl is disengaged from the cam; and opening the door.

DETAILED DESCRIPTION

Figure 1:
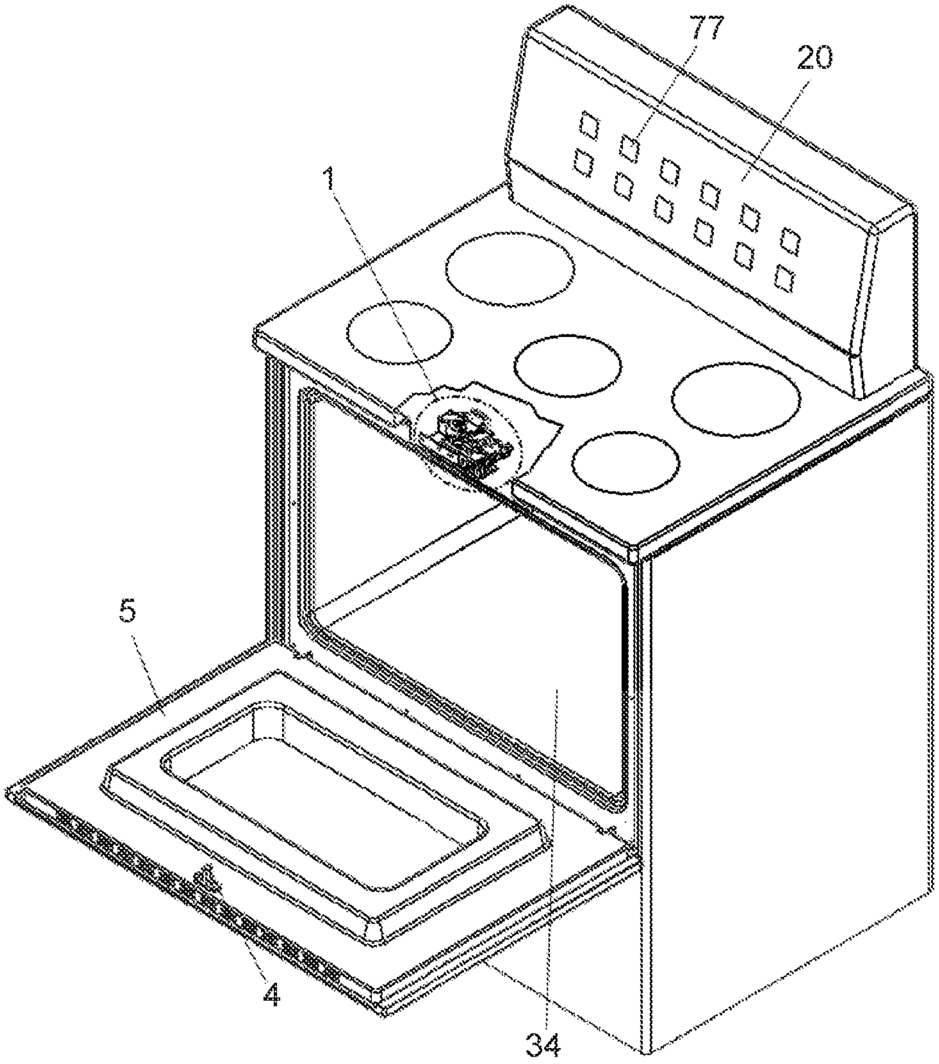
FIG. 1 is a perspective view of an oven appliance having a push-to-open latch with a motorized locking mechanism.
Figure 2:
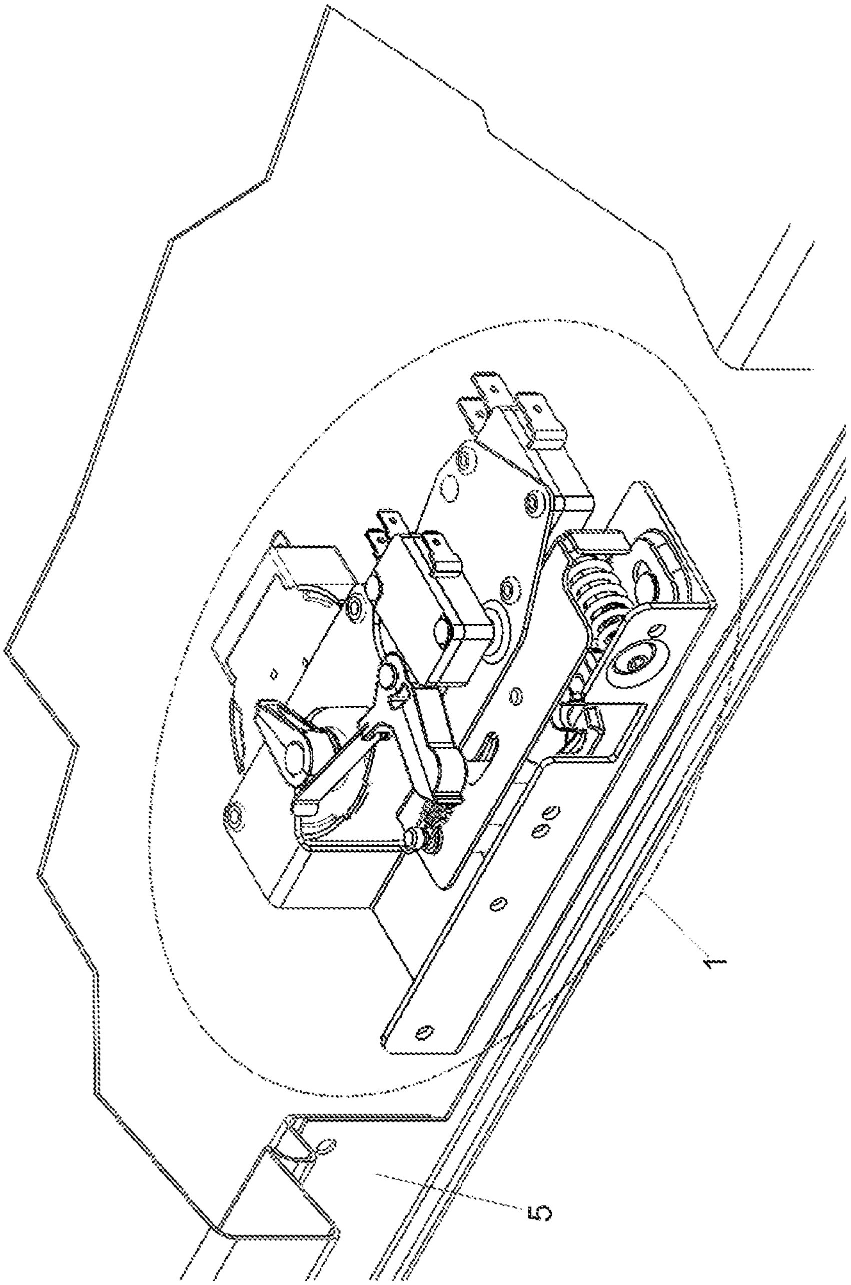
FIG. 2 is a perspective view of the push-to-open latch with a motorized locking mechanism in an oven appliance.
Figure 3:
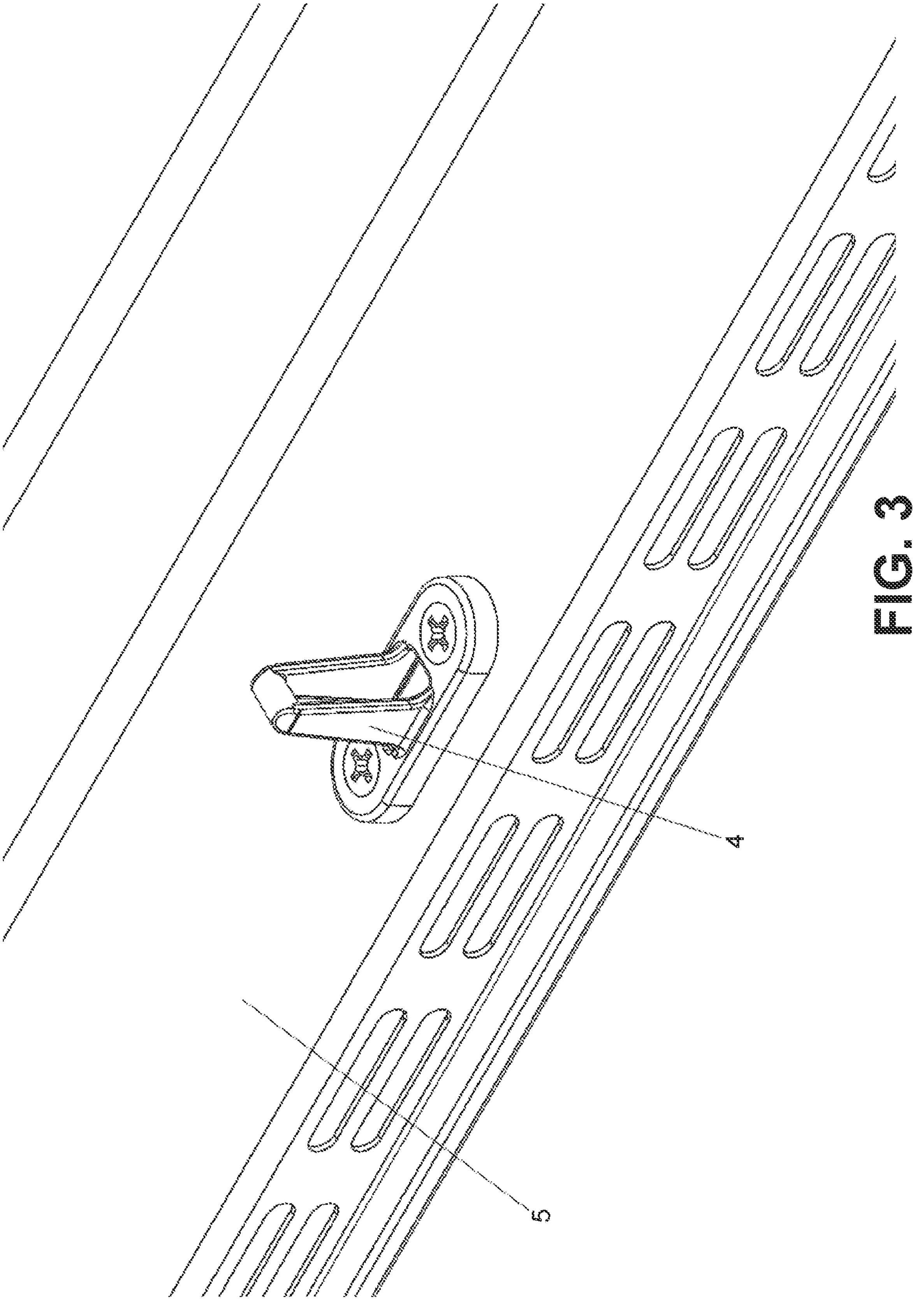
FIG. 3 illustrates a pawl attached to an inner liner surface of an oven door.
Figure 4:
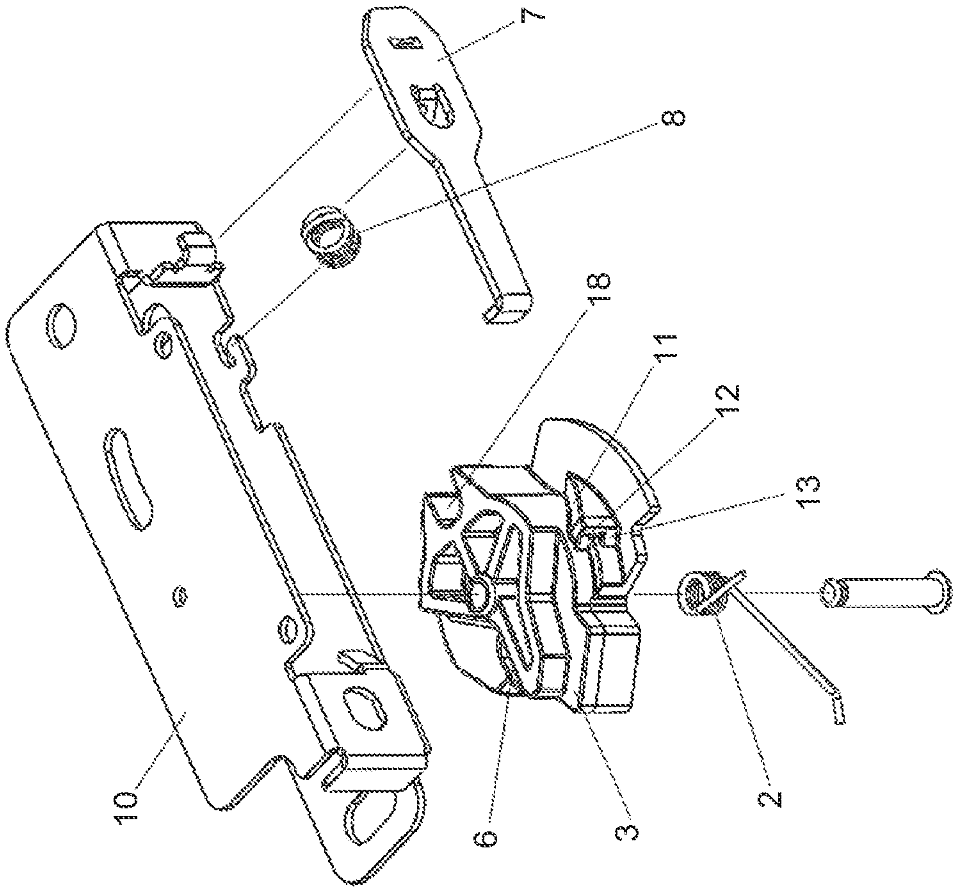
FIG. 4 is a partial exploded view of the push-to-open components of the push-to-open latch with a motorized locking mechanism.
Figure 5:
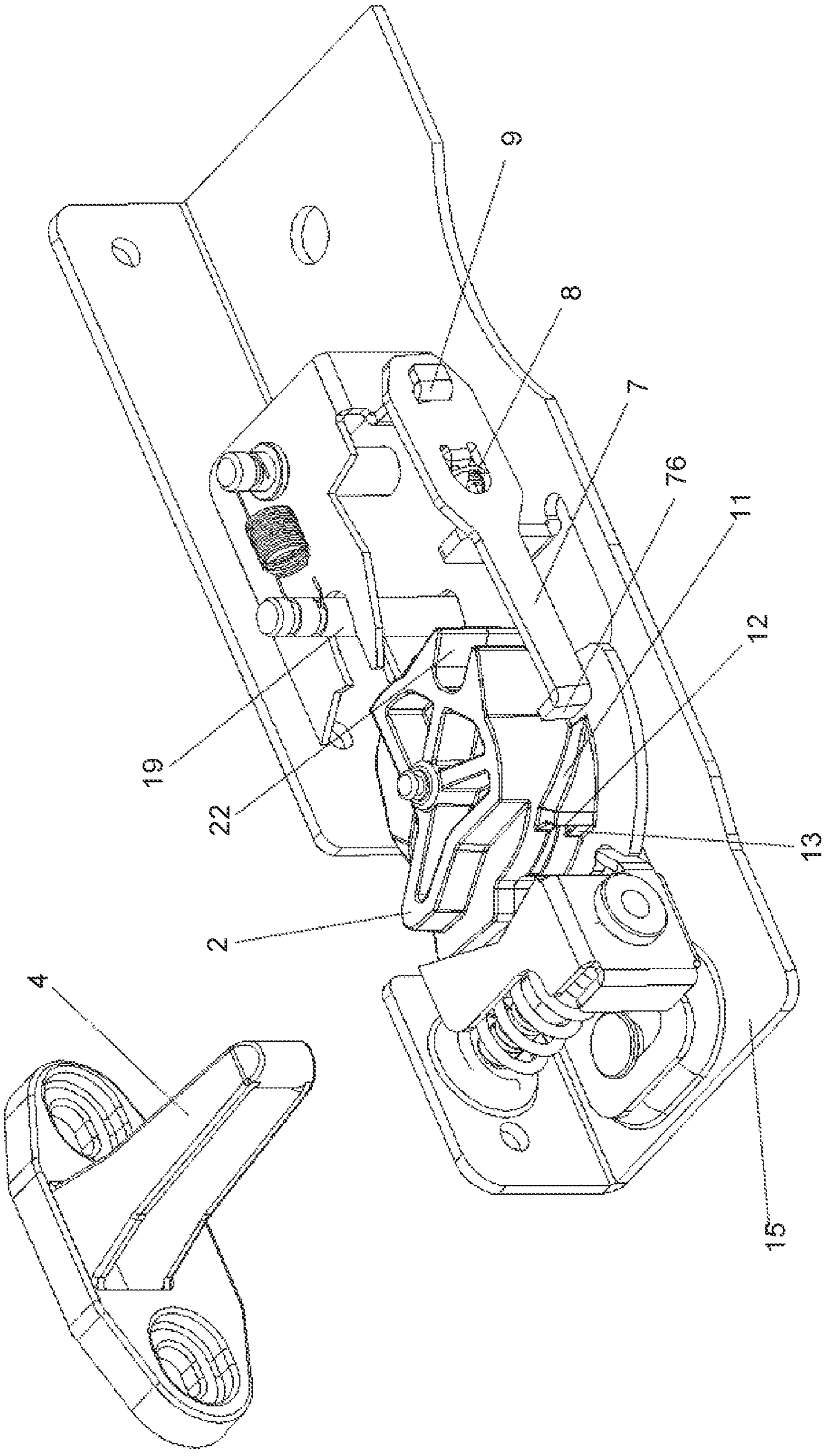
FIG. 5 is a cut-away view of the push-to-open components of the push-to-open latch with a motorized locking mechanism.
Figure 6:
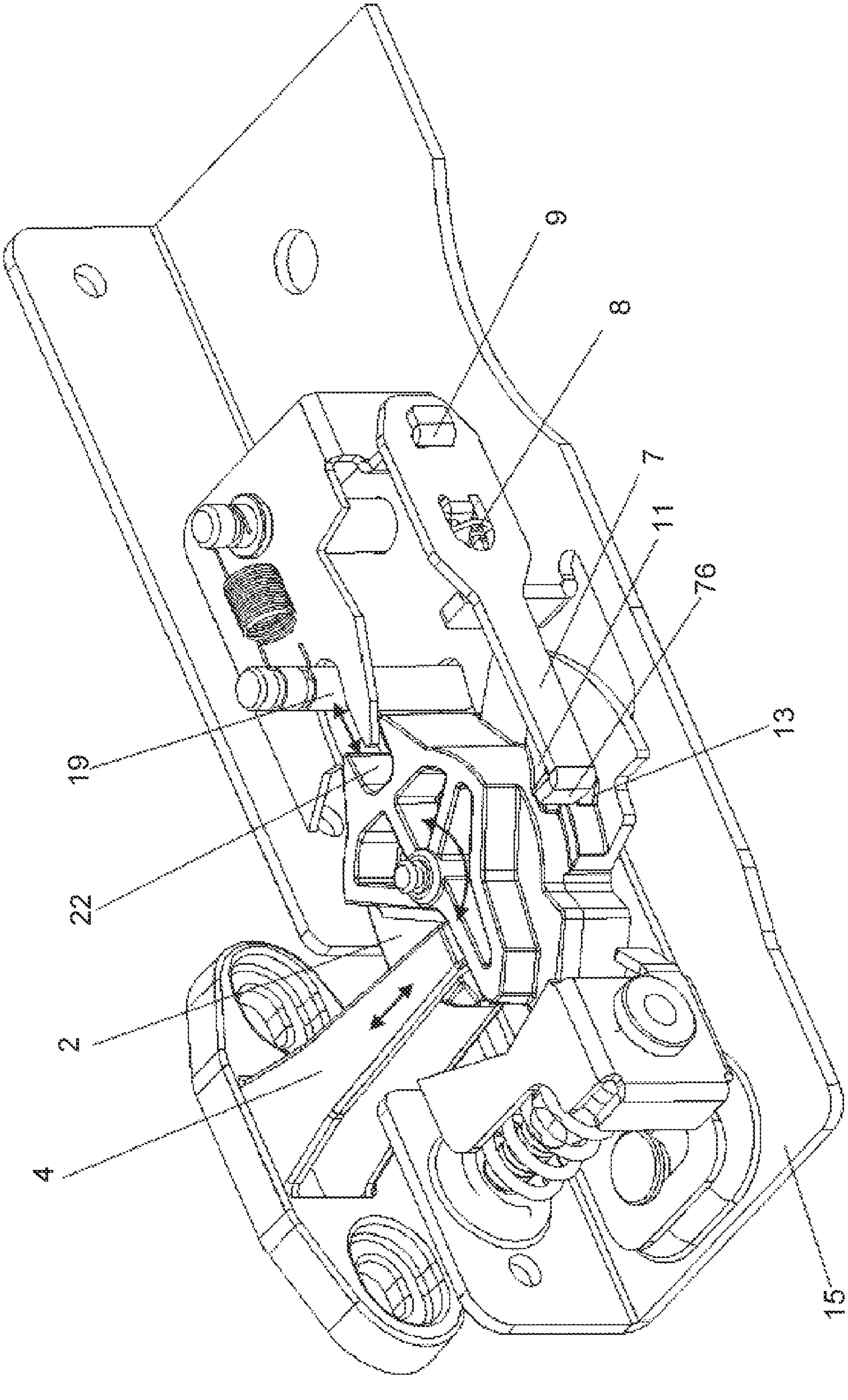
FIG. 6 is a cut-away view of the push-to-open components with the pawl engaged into the rotating cam of the push-to-open latch with a motorized locking mechanism.
Figure 7:
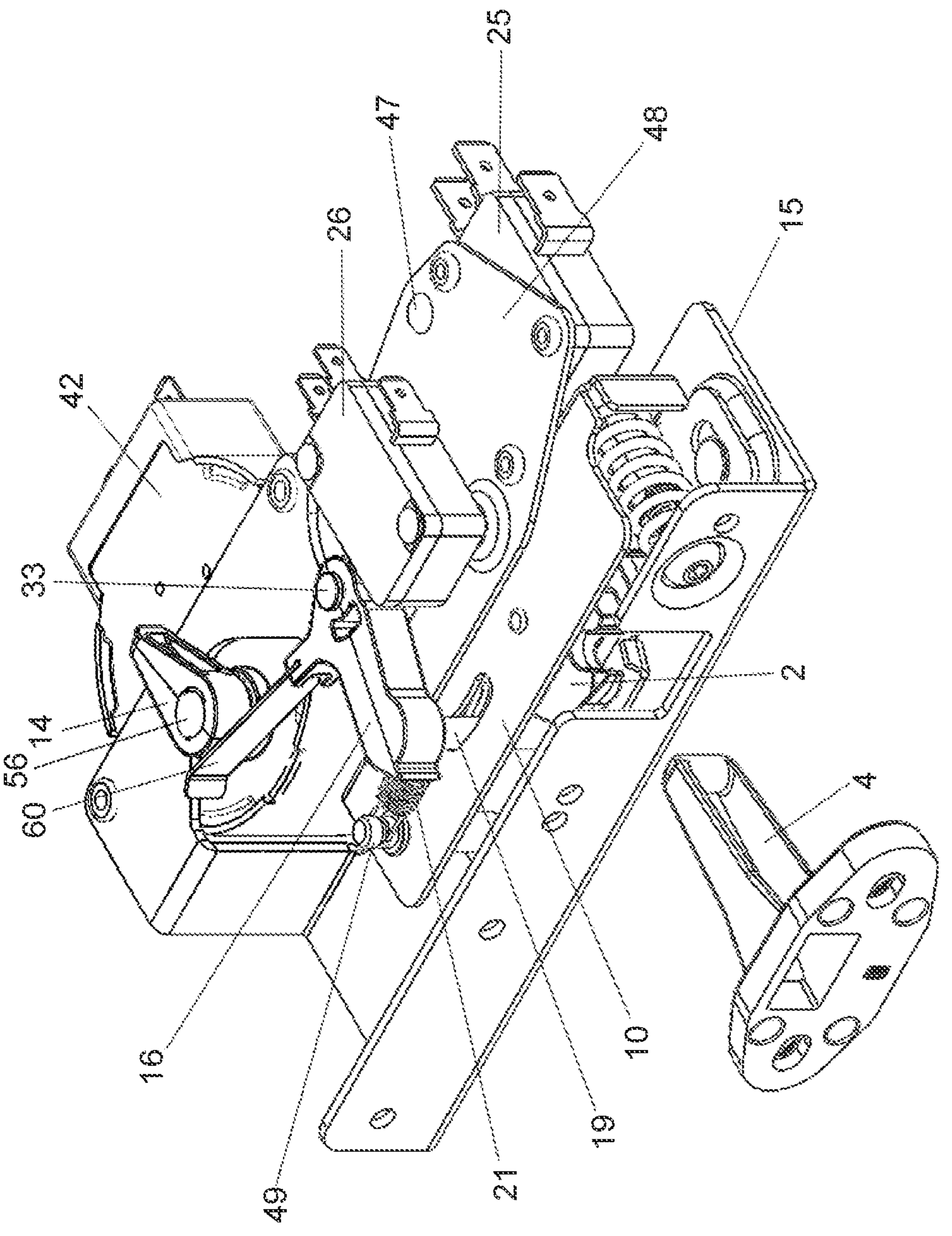
FIG. 7 is a perspective view of the push-to-open latch with a motorized locking mechanism and pawl in an unlatched condition.
Figure 8:
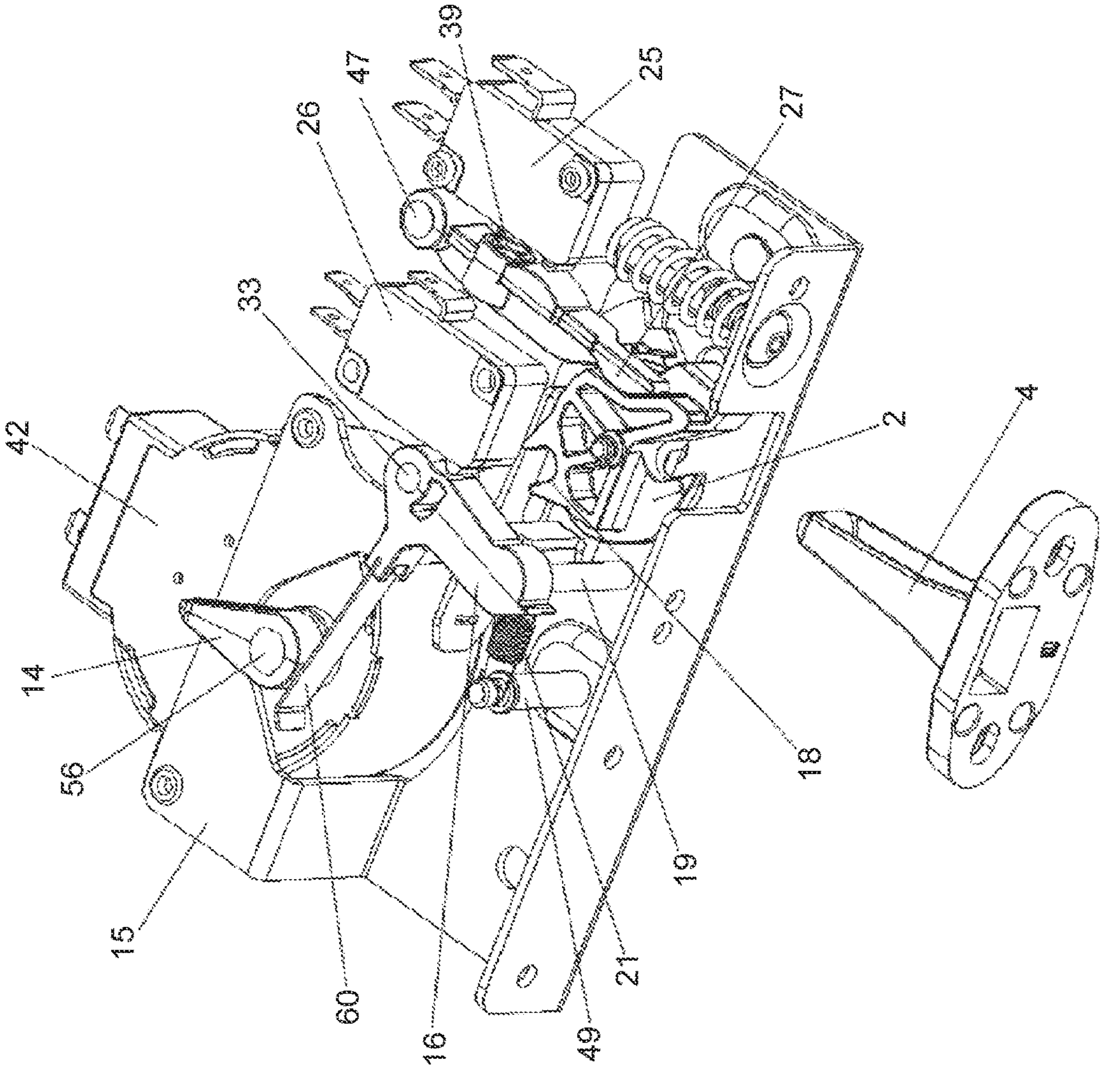
FIG. 8 is a cut-away perspective view of the push-to-open latch with a motorized locking mechanism and pawl in an unlatched condition.

Provided is a latching system for a household appliance such as an oven that is used for cooking. According to certain aspects of the present disclosure, the latching system includes a push-to-open oven appliance latch that includes an integrated locking device. The locking device functions as a safety feature, preventing a user from opening the oven door during operation of the oven's self-clean cycle and for a period time after completion of the self-cleaning cycle to allow the oven to cool.

Referring to FIGS. 1-14, the latch system and integrated locking device includes a push-to-open latch (1) with a rotating cam (2) that is rotationally biased with a torsion spring (3) and mechanically rotated by a pawl (4) affixed to the oven door (5). To engage the locking device, the oven door (5) is first pushed to a closed position so that a pawl (4) positioned on the inside surface of the oven door (5) engages the push-to-open latch (1). More specifically, as the oven door (5) is closed, the pawl (4) engages a latching slot (6) within a rotating cam (2) within the push-to-open latch (1). This engagement between the pawl (4) and the latching slot (6) forces the cam (2) to rotate. As the rotating cam (2) rotates, it engages a latching finger (7) positioned behind the rotating cam. The latching finger (7) is connected to a biasing spring (8) and has a first end pivotally affixed (9) to a carriage frame (10) which houses various components of the push-to-open latch system and integrated locking device and a second free end (76). As one end of the latching finger (7) is engaged by the cam, a guiding ramp (11) integral with the outside surface rotating cam (2) engages the second free end (76) of the latching finger (7). The latching finger continues its contact with the guiding ramp (11) and is guided along the guiding ramp (11) as the cam (2) rotates until the guiding ramp (11) comes into contact with a catch surface (12), a component which is also integral with the outside surface of the rotating cam (2). In this position, the latching finger (7) is mechanically engaged with the rotating cam (2). This prevents the rotating cam (2) from releasing the pawl (4), thus holding the oven door (5) in a closed or latched position for cooking and self-cleaning operations.

To release the pawl (4) and unlatch the oven door (5), the user must push the oven door (5) inwards near the push-to-open latch (1). This motion induces a small amount of counter-rotation of the rotating cam (2) in a direction that is opposite or away from oven door (5) opening. The counter-rotation of the rotating cam (2) guides the latching finger (7) to a secondary ramp (13) that is integrated on the exterior surface of the rotating cam (2). As the cam (2) continues to counter-rotate, the secondary ramp (13) causes the latching finger (7) to lift up from the catch surface. Thus, the upward motion caused by the secondary ramp's (13) contact with the latching finger (7) results in the latching finger (7) being released from the catch surface (12). Once the latching finger (7) is released from the catch surface (12) and travels back down the guiding ramp (11), the pawl (4) is released from the rotating cam's latching slot (6) and the oven door is free to move outward.

The push-to-open latch (1) includes a motorized locking mechanism which is constructed with a mounting bracket (15) that provides mounting features such as holes or apertures, to affix the latch to the oven appliance. A carriage frame (10) is the main structural component for the push-to-open latching functions of the latch. Within the carriage frame (10) are a rotating cam (2) and other components that perform various push-to-open functions. Affixed to the top surface of the carriage frame (10) is a switch and an actuator plate (48). Specifically, a rotating cam switch (25) and a locking arm switch (26) are rigidly attached to the switch and actuator plate (48). In certain embodiments, the rotating cam switch (25) is attached to a bottom surface of the actuator plate (48) and the locking arm switch (26) is attached to a top surface of the actuator plate (48) however, in other embodiments this configuration may be reversed so that the rotating cam switch (25) is attached to the top surface of the actuator plate (48) and the locking arm switch (26) is attached to the bottom surface of the actuator plate (48). A locking arm pivot (33) is inserted through a first end of a locking arm (16) and allows for rotation of the locking arm (16). A rotating cam switch actuator pivot (47) is inserted through a first end of rotating cam switch actuator (27). Both the locking arm pivot (33) and the rotating cam switch actuator pivot (47) are rigidly attached to the switch and actuator plate (48). The locking arm (16) includes a locking arm pin (19) positioned at a bottom surface at a second end of the locking arm (16) and an override spring arm (60) affixed to the first end of the locking arm (16) adjacent the locking arm pivot (33). In certain embodiments, the override spring arm (60) is rigidly affixed to the first end of the locking arm. A locking arm return spring (21) is provided and has a first end attached to the locking arm pin (19) and a second end attached to a carriage anchor pin (49). The rotating cam switch actuator (27) is pivotally affixed to the rotating cam switch actuator pivot (47). A rotating cam switch actuator spring (39) is provided which is retained within the rotating cam switch actuator (27) and rests against rotating cam switch (25).

The push-to-open latch (1) includes a synchronous electric motor (42) rigidly attached to the mounting bracket (15). A motor cam (14) is rigidly attached to the electric motor (42) through a motor shaft (56). When the door (5) is moved to a closed position, rotating cam (2) receives pawl (4) and the push-to-close latch is held in a latched condition. During the motion of closing the door (5) and latching the rotating cam (2), the rotating cam (2) moves the rotating cam switch actuator (27) causing it to rotate a rotating cam switch actuator bump (35) (positioned on the rotating cam switch actuator (27)) toward the rotating cam switch (25). When the rotating cam switch actuator bump (35) contacts the rotating cam switch (25), it causes a rotating cam switch button (30) to depress. Depressing the rotating cam switch button (30) causes a switch status signal to be provided to the oven's controller signaling that the door (5) is closed and latched. In this state, the user can activate the self-clean function of the appliance or more specifically, according to certain aspects of the present teaching, the oven. Upon activating the self-clean function, the oven's controller (20) acknowledges the closed door status and sends electric power to the synchronous electric motor (42) to run and rotate its motor shaft (56) thus rotating the motor cam (14) which in turn actuates the override spring arm (60) which in turn rotates locking arm (16) and locking arm pin (19) to engage locking pin slot (18) of rotating cam (2) thus locking the rotating cam (2) in a non-rotating condition. As the locking arm (16) rotates to the fully locked position, the locking arm switch ramp (28) depresses a locking arm switch button (32) on the locking arm switch (26) thus providing a door locked status signal to the oven's controller (20). Upon receiving this status signal, the controller stops powering the motor (42), stops rotating the motor cam (14) and commences with heating the oven to self-clean temperatures. The self-clean cycle will continue for a programmed period of time or if the locking arm switch status changes at which time, the heating will immediately stop.

Figure 9:
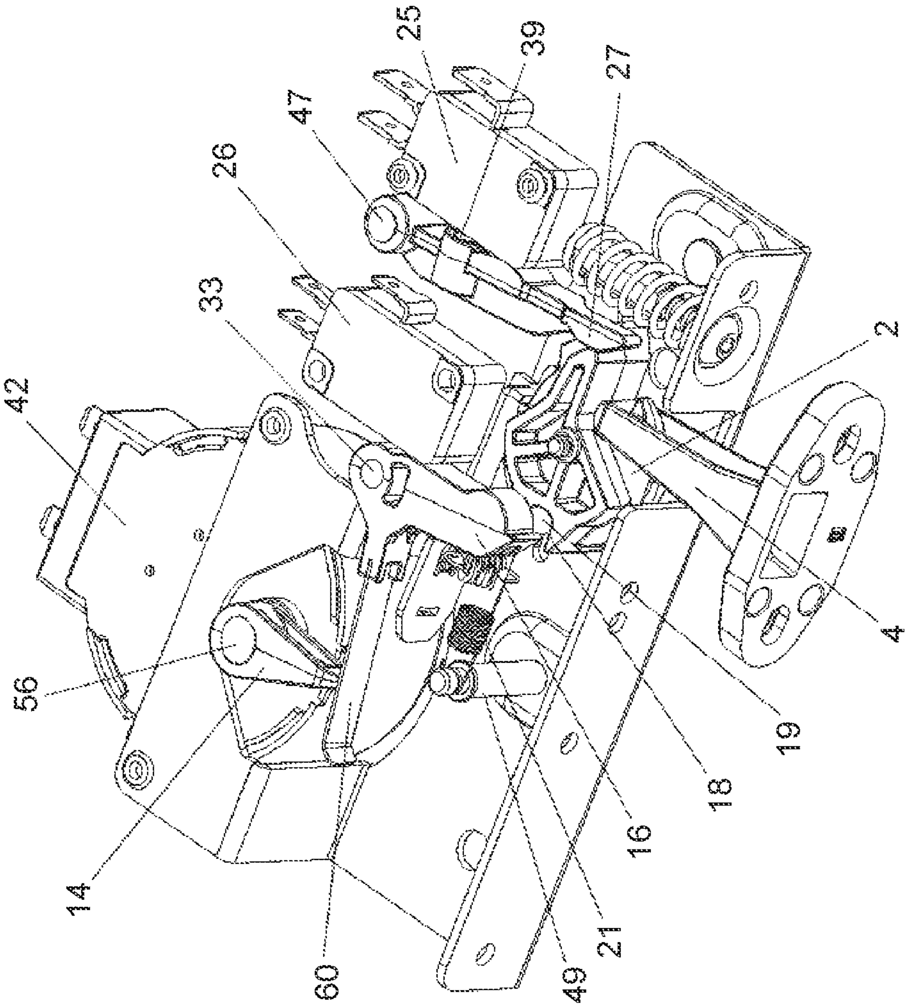
FIG. 9 is a perspective view of the push-to-open latch with a motorized locking mechanism and pawl in a latched and locked condition.
Figure 10:
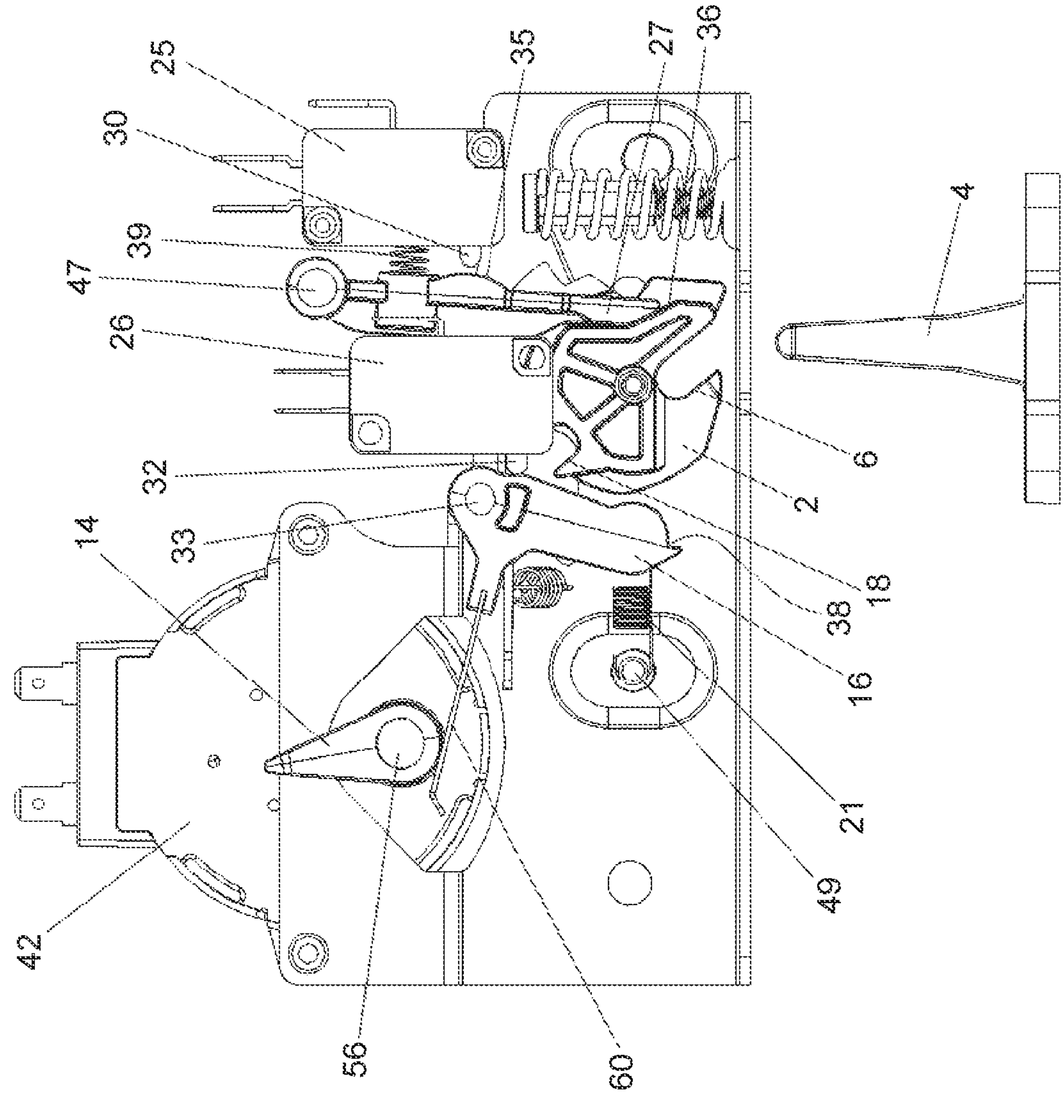
FIG. 10 is a top cut-away view of the push-to-open latch with a motorized locking mechanism and a pawl in an unlatched condition.
Figure 11:
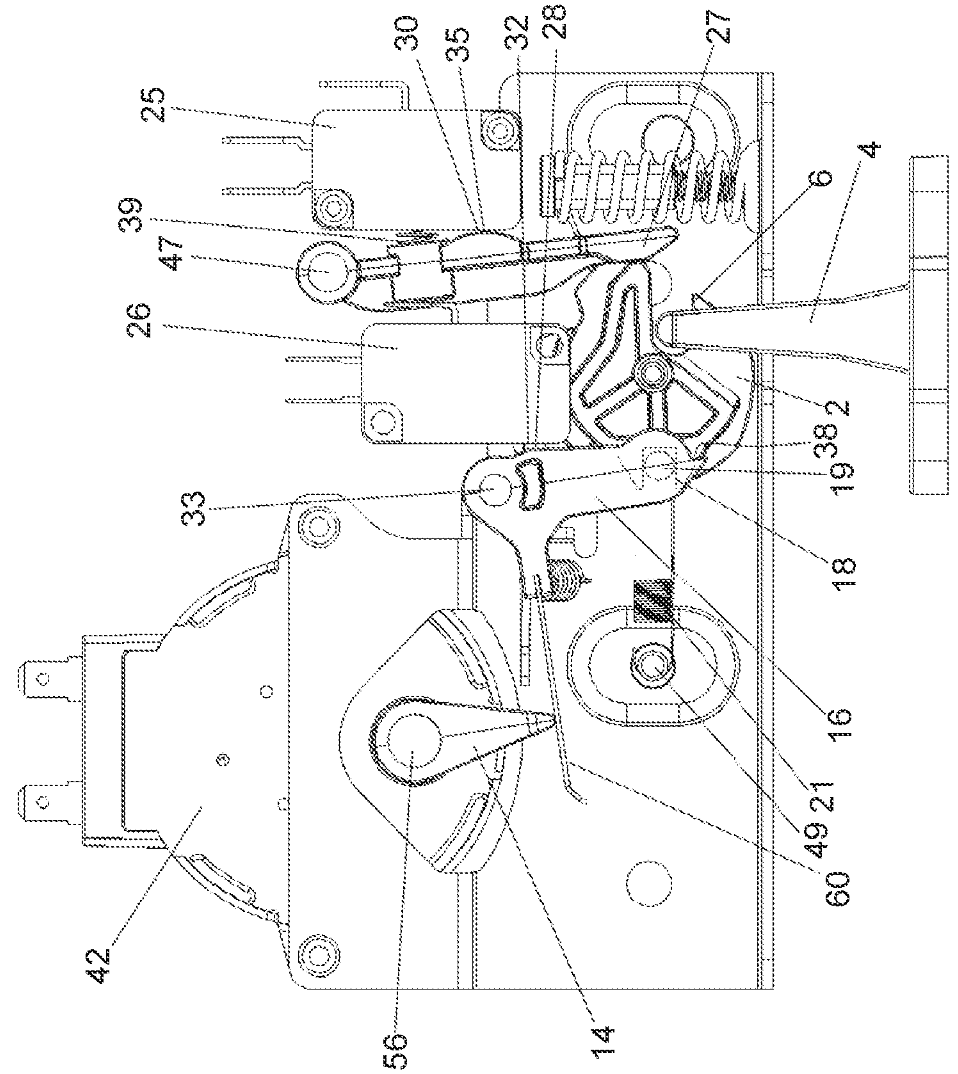
FIG. 11 is a top cut-away view of the push-to-open latch with a motorized locking mechanism and a pawl in a latched and locked condition.
Figure 12:
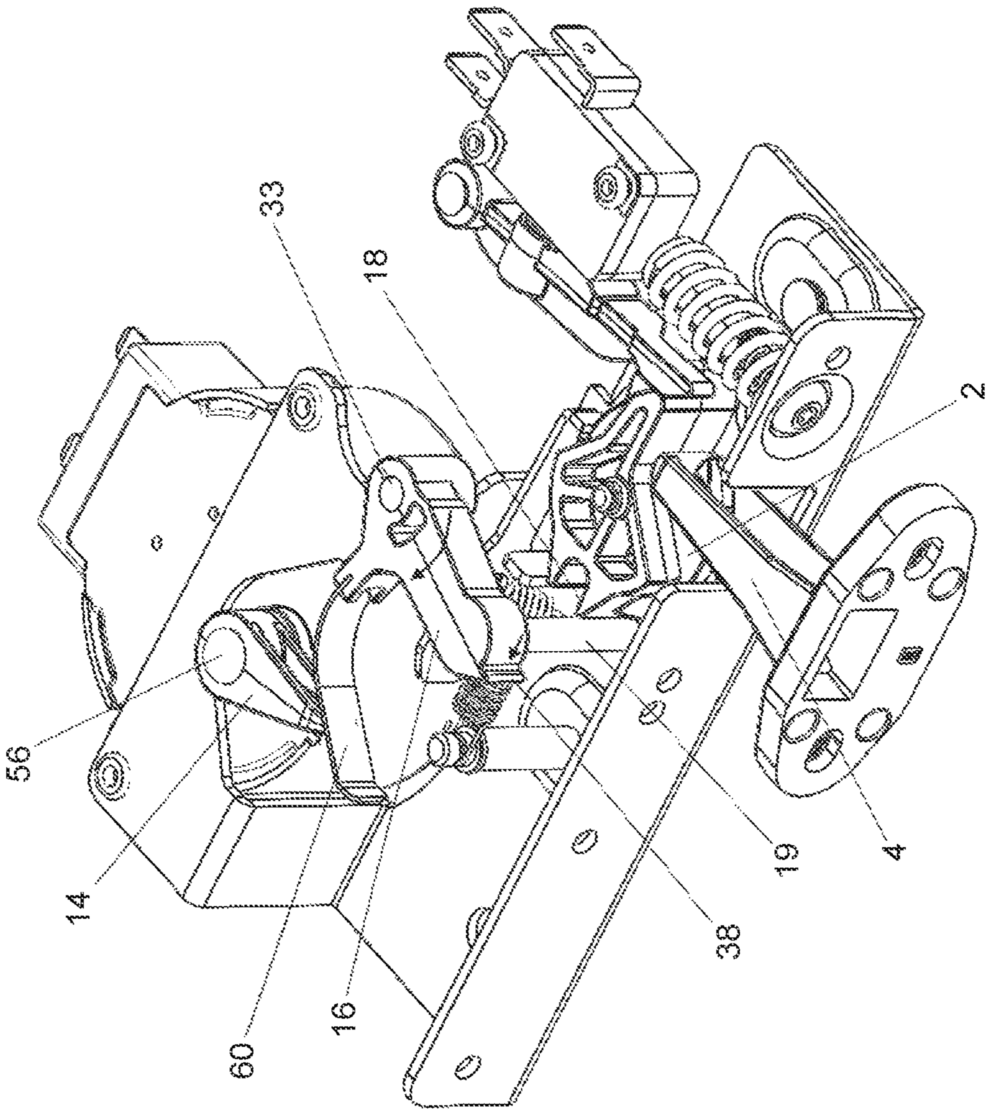
FIG. 12 is a perspective view of the push-to-open latch with a motorized locking mechanism and pawl in a manual lock override condition but still latched.
Figure 13:
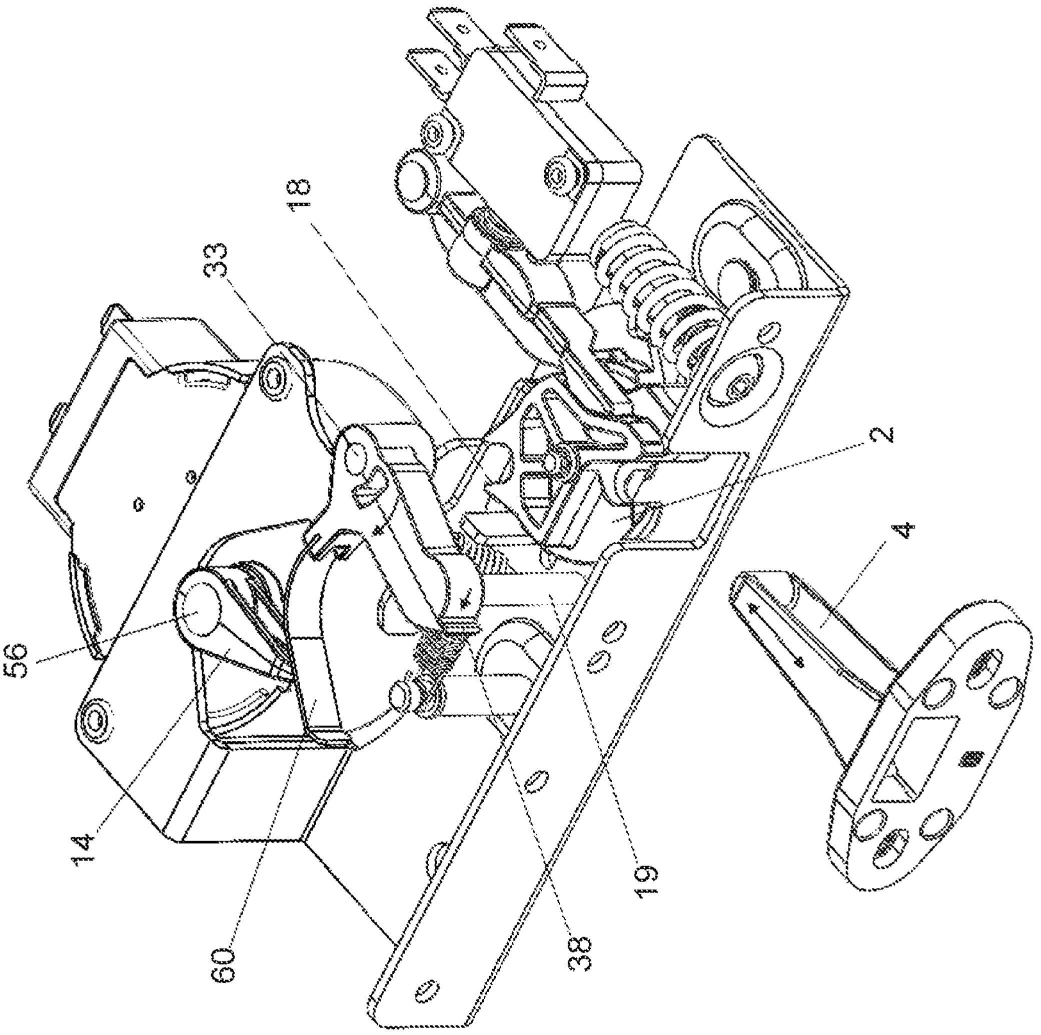
FIG. 13 is a perspective view of the push-to-open latch with a motorized locking mechanism and a pawl in a manual lock override condition and unlatched.
Figure 14:
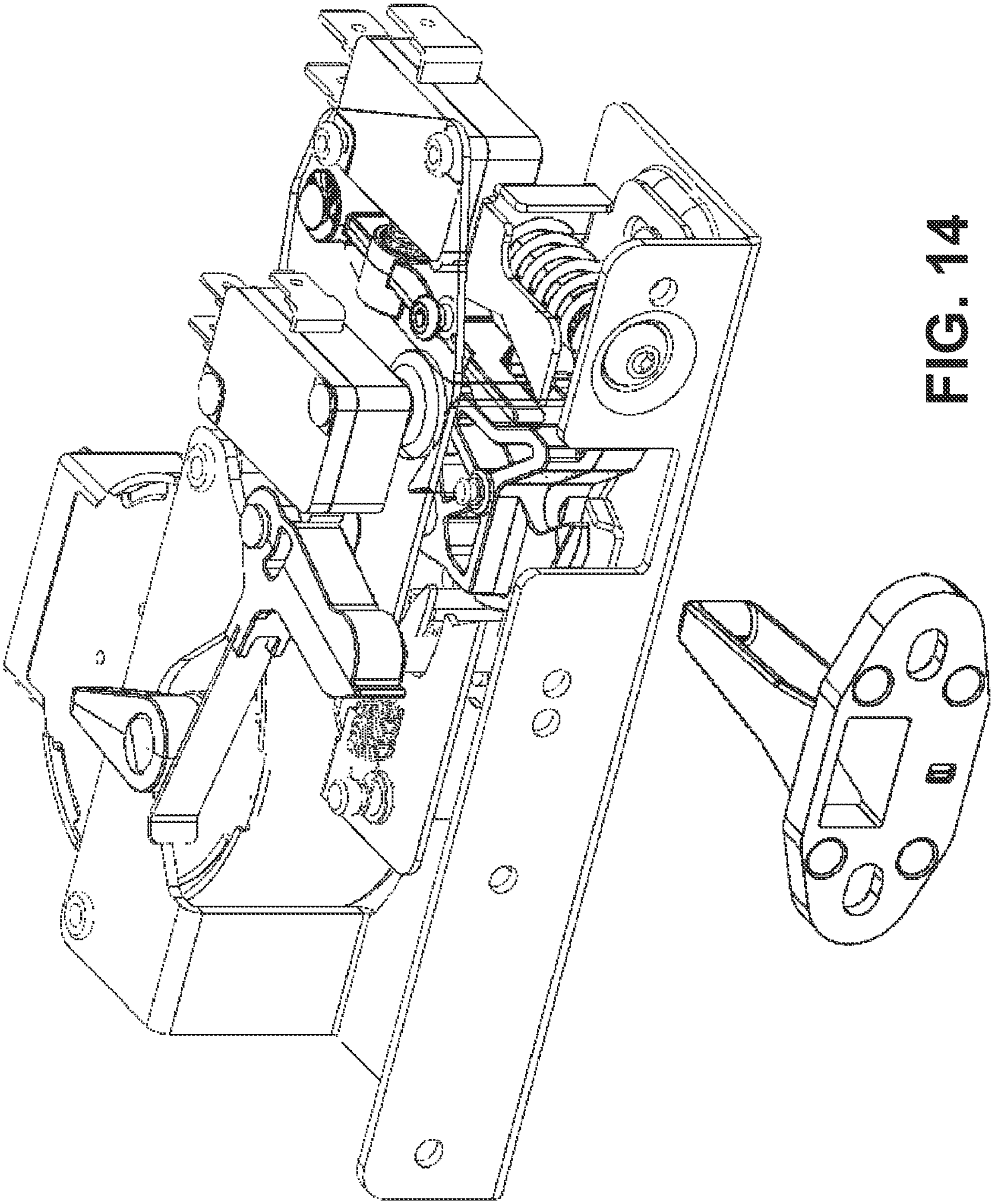
FIG. 14 is a perspective view of the push-to-open latch with a motorized locking mechanism and a pawl in an unlatched condition.

Referring to FIGS. 9-10, the locking function of the push-to-open latch (1) with a motorized locking mechanism can be overridden in the event of a power outage or a need to service replace a failed latch that is in a locked state. According to certain aspects of the present teaching, the locking arm (16) is rigidly affixed to an override spring arm (60) which is constructed of a flexible spring steel material and which extends from the first end of the locking arm. In further embodiments, the locking arm (16) includes a locking arm tool override tool recess (38). The locking arm tool override tool recess (38) provides a means for engaging it with a tool such as a flat blade screwdriver to rotationally move the locking arm (16) and pull locking arm pin (19) out of the locking pin slot (18). Access to the locking arm tool override tool recess may be provided by an aperture present in the body of the appliance or oven. This manually induced movement provided by the tool requires significant force to overcome the counteracting forces of override spring arm (60) which is being flexed due to the contact pressure it is experiencing from contact with motor cam (14) and which is held in a non-rotational position by the motor shaft (56). With locking arm pin (19) pulled out of the locking pin slot (18), the cam (2) is free to rotate and the push-to-open function of the latch is free to operate; simply push-in the door (5) and it will open.

Also provided is a method of operating a push-to-open appliance or oven door latching and integrated locking system having a signal-to-open system and a manual override system. In summary, the method includes the following steps. First, an operator closes an oven door causing the pawl to contact the rotating cam and to rotate the rotating cam to a closed position. Upon rotation of the rotating cam to the closed position, the latching finger engages the catch surface on the rotating cam to lock it into position. Movement of the rotating cam upon closing the door causes the rotating cam switch actuator to move to contact the rotating cam switch. Upon contacting the rotating cam switch, the rotating cam switch is activated and sends an electrical signal to the controller indicating that the door is now closed and latched. The controller then activates the self-clean function of the appliance or oven. Activation of the self-clean function may be automatic or upon the controller receiving an input from the user. Upon activation of the self-clean function, the controller sends electrical power to the electric motor. The electric motor rotates its motor shaft which in turn rotates a motor cam which causes a locking arm to rotate. Rotation of the locking arm causes a locking pin to rotate and engage a locking pin slot in the rotating cam, thereby locking the rotating cam in a non-rotating position. Rotation of the locking arm also causes the locking arm to contact the locking arm switch. The locking arm switch is then activated and sends a signal to the controller. Upon receiving the signal form the locking arm switch, the controller stops power to the motor. Rotation of the motor cam stops. The controller also sends a signal for an appliance or oven heating element to initiate heating of the appliance or oven to temperatures suitable for self-cleaning. Self-cleaning continues until a programmed cycle or period of time is completed or until the locking arm status changes.

Also provided is a method of overriding a locking function of a push-to-open latch. The method includes the following steps. First, a locking arm tool (e.g., including but not limited to a flat blade screwdriver) is inserted into a locking arm tool override tool recess. The locking arm tool is then moved in the recess to rotationally move the locking arm so that the locking arm pin is pulled out of the locking pin slot and out of the cam. Without the locking arm pin out of the cam, the cam is now free to rotate. The appliance or oven door may then be pushed inwards to open the door. This inward movement causes the cam to rotate, allowing the pawl to be disengaged from the cam so that the door can be opened by the user.

The process for opening the appliance door may be initiated by an operator pushing the appliance door to open it (e.g., push-to-open function), by an operator engaging a signal button, by an operator issuing an audible command with his or her voice to activate a voice-activated signal or by an operator providing movement to activate a motion-activated signal (e.g., signal-to-open function). Upon opening the appliance door, a signal is sent by the rotating cam switch to the controller indicating the appliance door is open and the controller in turn sends a signal to illuminate the light within the interior space of the appliance. The signal-to-open function and the push-to-open function are both ways to open an appliance or oven door during cooking and self-cleaning operations. In certain embodiments, appliances and ovens with mechanisms disclosed herein which provide for signal-to-open and push-to-open functions of latches will not have handles to pull open the appliance or oven door. In further embodiments, mechanisms related to the push-to-open and signal-to-open functions provide the only way to open the appliance or oven door.

While the apparatus and method for the push-to-open appliance door latching system with an integrated locking device has been described above in connection with various illustrative embodiments, it is to be understood that other similar embodiments may be used or modifications and additions may be made to the described embodiments for performing the same function disclosed herein without deviating therefrom. Further, all embodiments disclosed are not necessarily in the alternative, as various embodiments may be combined or subtracted to provide the desired characteristics. Variations can be made by one having ordinary skill in the art without departing from the spirit and scope hereof. Therefore, the apparatus and method for the push-to-open appliance door latching system with an integrated locking device should not be limited to any single embodiment, but rather construed in breadth and scope in accordance with the recitations of the appended claims. The right to claim elements and/or sub-combinations that are disclosed herein as other inventions in other patent documents is hereby unconditionally reserved.

Having thus described the disclosed system and method, it is now claimed:

What is claimed is:

1. A push-to-open latching and locking system for a door connected to an appliance, the push-to-open latching and locking system comprising:

- an appliance door supported on an appliance by a hinge, wherein the appliance door may be adjusted between an open position and a closed position to allow access to an appliance cavity and wherein the appliance door includes a pawl;
- a latch connected to the appliance which is capable of engaging the pawl on the appliance door,
- a controller which is electrically connected to the push-to-open latching and locking device; and,
- a motorized locking mechanism comprising:
  - a synchronous electric motor and a motor cam engaged to the motor through a motor shaft,
  - a switch and actuator plate positioned on a top surface of the carriage frame;
  - a rotating cam switch and a locking arm switch attached to the switch and actuator plate;
  - a locking arm engaged to the switch and actuator plate through a locking arm pivot;
  - a rotating cam switch actuator engaged to the switch and actuator plate through a rotating cam switch actuator pivot;
  - a latch mounting bracket comprising a flat planar surface and a vertical side edge;

a carriage frame connected to the flat planar surface of the latch mounting bracket, wherein the carriage frame comprises a bottom surface, a side surface, a top surface having a top end and a bottom end;

a rotating cam having an exterior surface connected to the latch mounting bracket and rotatable with respect to the latching mounting bracket, wherein the rotating cam comprises:

a latching slot integrated within the exterior surface for engaging the pawl;

a guiding ramp on the exterior surface of the rotating cam;

a catch surface;

a secondary ramp, and a latching finger having a first end which is attached to the carriage frame and a second end having a projection, wherein the second end of the latching finger is capable of being lifted by the guiding ramp upon rotation of the rotating cam in a first direction when a user engages the rotating cam with the pawl, wherein complete rotation of the rotating cam in the first direction results in the latching finger engaging the catch surface of the rotating cam, wherein the latching finger may be released from the catch surface by a user pushing in the appliance door near the latch to induce rotation of the rotating cam in a second opposite direction, wherein rotation of the rotating cam in the second direction guides the latching finger to the secondary ramp and results in lifting the latching finger to release the latching finger from the catch surface.

2. The push-to-open latching and locking system of claim 1, wherein the motor is positioned on the latch mounting bracket.

3. The push-to-open latching and locking system of claim 2, wherein the locking arm pivot allows for rotational movement of the locking arm with respect to the switch and actuator plate.

4. The push-to-open latching and locking system of claim 3, wherein the rotating cam switch actuator pivot allows for rotational movement of the rotating cam switch actuator with respect to the switch and actuator plate.

5. The push-to-open latching and locking system of claim 4, wherein the locking arm comprises a first end and a second end, wherein the locking arm pivot is positioned at the first end of the locking arm and wherein the second end of the locking arm comprises a locking arm pin which extends from a bottom surface at the second end of the locking arm.

6. The push-to-open latching and locking system of claim 5, wherein the locking arm comprises an override spring arm affixed to the first end of the locking arm, wherein the override spring arm is capable of contacting the motor cam.

7. The push-to-open latching and locking system of claim 6, wherein the locking arm comprises a locking arm return spring having a first end engaged to the locking pin and a second end engaged to a carriage anchor pin.

8. The push-to-open latching and locking system of claim 7, wherein the rotating cam switch actuator comprises a first end and a second end, wherein a rotating cam switch actuator spring is engaged to the second end of the rotating cam switch actuator and rests against the rotating cam switch.

9. The push-to-open latching and locking system of claim 8, wherein the locking arm switch comprises a locking arm switch button.

10. The push-to-open latching and locking system of claim 9, wherein the locking arm comprises a locking arm switch ramp capable of pressing the locking arm switch button.

11. The push-to-open latching and locking system of claim 10, wherein the rotating cam switch comprises a rotating cam switch button.

12. The push-to-open latching and locking system of claim 11, wherein the rotating cam switch actuator comprises a rotating cam switch actuator bump capable of pressing the rotating cam switch button.

13. The push-to-open latching and locking system of claim 12, wherein the motor cam rotates to actuate the override spring arm which in turn rotates the locking arm and locking arm pin to engage a locking pin slot in the rotating cam to lock the rotating cam in a non-rotating condition.

14. The push-to-open latching and locking system of claim 13, wherein the locking arm switch upon pressing of the locking arm switch button by the locking arm switch ramp provides a door locked status signal to the controller, wherein upon receiving the door locked status signal, the controller stops powering the motor and stops rotating the motor cam.

15. The push-to-open latching and locking system of claim 14, wherein the locking arm comprises a locking arm tool override tool recess which is capable of receiving a tool to manually rotate the locking arm to pull the locking arm pin out of the locking pin slot.

16. The push-to-open latching and locking system of claim 15, wherein closing the door causes the pawl to contact the rotating cam and to rotate the rotating cam to a closed position;

wherein upon rotation of the rotating cam to the closed position, the latching finger engages the catch surface on the rotating cam to lock it into position;

wherein rotational movement of the rotating cam upon closing the door causes the rotating cam to contact the rotating cam switch actuator which in turn causes the rotating cam switch actuator to move to contact the rotating cam switch;

wherein upon contacting the rotating cam switch, the rotating cam switch is activated and sends an electrical signal to the controller indicating that the door is closed and latched;

wherein the controller activates an appliance self-clean function;

wherein upon activating the self-clean function, the controller sends electrical power to the electric motor;

wherein the electric motor rotates the motor shaft, which in turn rotates a motor cam which causes a locking arm to rotate;

wherein rotation of the locking arm causes a locking pin to rotate and engage a locking pin slot in the rotating cam, thereby locking the rotating cam in a non-rotating position;

wherein rotation of the locking arm also causes the locking arm to contact and activate the locking arm switch;

wherein the activated locking arm switch sends a signal to the controller;

wherein upon receiving a signal from the locking arm switch, the controller stops power to the motor causing rotation of the motor cam to stop;

wherein the door is now locked;

wherein the controller sends a signal for an appliance heating element to initiate heating of the appliance to temperatures suitable for self-cleaning wherein self-cleaning continues until a programmed cycle or period of time is completed or until a position of the locking arm changes by manual override.

17. A method for overriding a latched and locked door of the push-to-open latching and locking system of claim 16, the method comprising:

inserting a locking arm tool into a locking arm tool override tool recess moving the locking arm tool in the recess to rotationally move the locking arm so that the locking arm pin is pulled out of the locking pin slot and out of the cam pushing the door inwards to allow the cam to rotate so that the pawl is disengaged from the cam; and opening the door.

* * * * *